Jan. 17, 1928. 1,656,223

C. F. OBERLY

PIG FEEDER

Filed March 17, 1927

Inventor
C. F. Oberly
By C. A. Snow & Co.
Attorney

Patented Jan. 17, 1928.

1,656,223

UNITED STATES PATENT OFFICE.

CHRISTIAN F. OBERLY, OF HUMBOLDT, NEBRASKA.

PIG FEEDER.

Application filed March 17, 1927. Serial No. 176,125.

This invention has reference to a feed trough especially designed for use in feeding hogs, the primary object of the invention being to provide means whereby the weight of the hogs using the feeder will actuate or tilt the feeder to cause material to be fed to the troughs thereof.

Another object of the invention is to provide a device of this character which will automatically move to its normal position when the animal moves off of the platform.

A still further object of the invention is to provide a hopper having a flared bottom to direct material laterally and insure against the material clogging to defeat the purpose of the invention.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
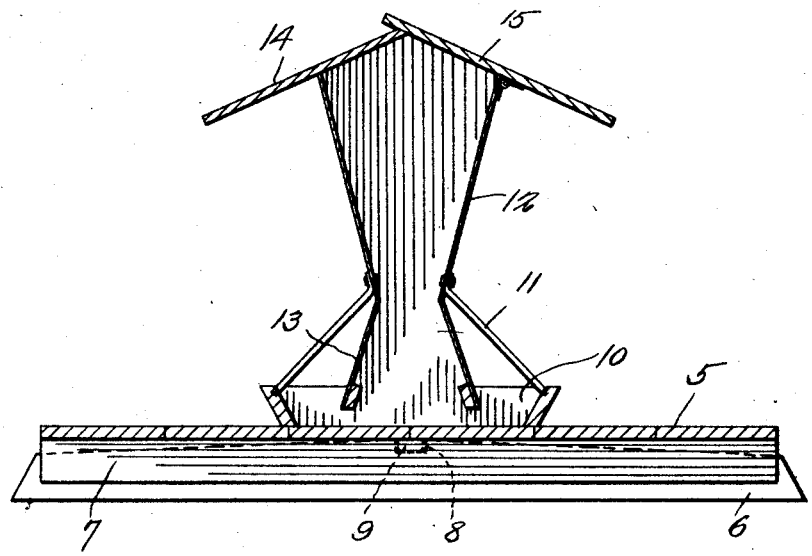
Figure 1 is a vertical sectional view through a feeder constructed in accordance with the invention.
Figure 2:
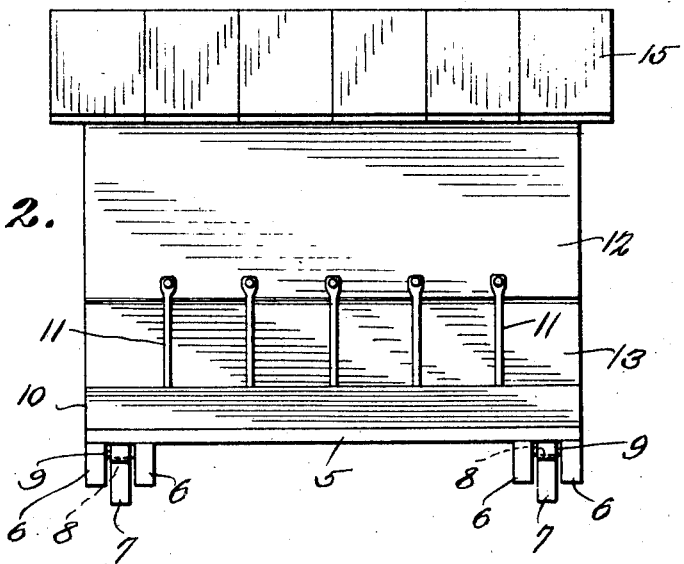
Figure 2 is a side elevational view thereof.

Referring to the drawing in detail, the reference character 5 designates the platform on which the animal using the feeder places his front feet to gain access to the feed in the troughs, to be hereinafter more fully described.

Arranged in pairs and disposed adjacent to the side edges of the platform are bars 6, the bars of each pair being disposed in spaced relation to fit over the supporting bars 7 that have inclined upper edges inclined from a point intermediate the ends of the bars 7, to the outer ends of the bars 7 as clearly shown by Figure 1 of the drawing.

Arranged at points intermediate the ends of the bars are cut out portions 8, which cut out portions accommodate the blocks 9 that are secured between the bars of each pair 6, at points intermediate the ends of the bars and provide pivots on which the platform rocks.

The reference character 10 designates a trough arranged transversely of the platform, and as shown, spaced bars 11 are secured to the trough and extend upwardly where they are secured to the hopper 12, which has a flared lower extremity 13 terminating in spaced relation with the bottom of the trough to permit feed to pass from the hopper into the trough when the hopper is tilted.

The reference character 14 designates one of the roof sections of the hopper and as shown, the roof section is of a width to extend an appreciable distance beyond the side walls of the hopper to guard the trough thereunder and prevent rain or other foreign matter from entering the trough.

The reference character 15 designates the movable section of the roof which is hingedly connected to the hopper so that when the section 15 is swung outwardly, feed may be readily positioned in the hopper.

Thus it will be seen that due to this construction an animal placing his feet on the platform, will cause the platform to tilt with the result that the feed in the hopper will be shaken into the trough where the animal will have access thereto.

It will further be seen that due to this construction the trough will be divided into a plurality of feeding compartments to the end that the animals may not interfere with each other while feeding.

I claim:

1. A feeder of the class described including a platform, having pairs of spaced bars arranged adjacent to the side edges thereof, supporting bars positioned between the bars of each pair, said supporting bars having inclined upper surfaces inclined towards the ends thereof from points centrally of the supporting bars to permit the platform to tilt with respect to the supporting bars, means for restricting movement of the platform longitudinally of the supporting bars, a hopper and feed trough mounted on the platform, and said hopper adapted to feed material into the trough.

2. A feeder of the class described including a platform, pairs of spaced bars arranged adjacent to the sides of the platform, supporting bars having inclined upper surfaces, positioned between the bars of each pair, said supporting bars having cut out portions formed intermediate their ends, blocks positioned between the bars of each pair and adapted to rest in the cut out portions to pivotally support the platform, a hopper and trough supported on the platform, and a cover for the hopper.

In testimony that I claim the foregoing as my own, I have hereto affixed my signature.

CHRISTIAN F. OBERLY.